United States Patent
Järvinen et al.

(10) Patent No.: US 7,670,575 B2
(45) Date of Patent: Mar. 2, 2010

(54) METHOD AND DEVICE FOR TREATING ANODE SLIME

(75) Inventors: Olli Järvinen, Espoo (FI); Pekka Taskinen, Pori (FI); Olli Hyvärinen, Pori (FI); Henri Virtanen, Pori (FI); Leo Lindroos, Pori (FI)

(73) Assignee: Outotec Oyj, Espoo (FI)

( * ) Notice: Subject to any disclaimer, the term of this patent is extended or adjusted under 35 U.S.C. 154(b) by 511 days.

(21) Appl. No.: 11/570,857

(22) PCT Filed: Jul. 5, 2005

(86) PCT No.: PCT/FI2005/000315

§ 371 (c)(1),
(2), (4) Date: Dec. 18, 2006

(87) PCT Pub. No.: WO2006/003246

PCT Pub. Date: Jan. 12, 2006

(65) Prior Publication Data

US 2007/0274884 A1   Nov. 29, 2007

(30) Foreign Application Priority Data

Jul. 7, 2004   (FI) .................................. 20040945

(51) Int. Cl.
*C01B 19/00* (2006.01)
*C22B 7/00* (2006.01)
*F23B 99/00* (2006.01)

(52) U.S. Cl. .......................... 423/1; 423/508; 110/233; 110/297; 110/349; 75/418; 75/714

(58) Field of Classification Search ............... 423/1, 423/508; 110/233, 297, 349; 75/418, 714
See application file for complete search history.

(56) References Cited

U.S. PATENT DOCUMENTS

| 2,039,256 | A | * | 4/1936 | Martin et al. ................. 75/418 |
| 2,775,509 | A | | 12/1956 | Lebedeff et al. |
| 3,419,355 | A | * | 12/1968 | Von Stein ................... 423/510 |
| 3,627,486 | A | * | 12/1971 | Nakano ...................... 423/509 |
| 3,944,414 | A | * | 3/1976 | Yanagida et al. ............. 75/418 |
| 4,002,544 | A | * | 1/1977 | Heimala et al. ............. 205/568 |
| 4,081,506 | A | | 3/1978 | Proplesch et al. |
| 4,163,046 | A | * | 7/1979 | Subramanian et al. ........ 75/418 |
| 4,228,133 | A | | 10/1980 | Lindroos et al. |
| 4,581,064 | A | * | 4/1986 | Morrison et al. ............. 75/631 |
| 4,874,429 | A | * | 10/1989 | Bertha ........................ 75/418 |

FOREIGN PATENT DOCUMENTS

WO   2005028686   3/2005

\* cited by examiner

*Primary Examiner*—Timothy C Vanoy
(74) *Attorney, Agent, or Firm*—Chernoff, Vilhauer, McClung & Stenzel

(57) ABSTRACT

The method and furnace according to the invention enable a continuous processing of anode slime and are particularly suited to be connected to a process where anode slime is treated by hydrometallurgic methods after roasting. In the method according to the invention, the slime containing valuable metals and selenium is dried, roasted, sulfatized and cooled. The method includes steps to be carried out in succession, in continuous operation, so that the slime forms a slime layer on the conveyor and is conveyed to be treated in successive drying, roasting, sulfatizing and sulfuric acid removal and cooling units.

11 Claims, 2 Drawing Sheets

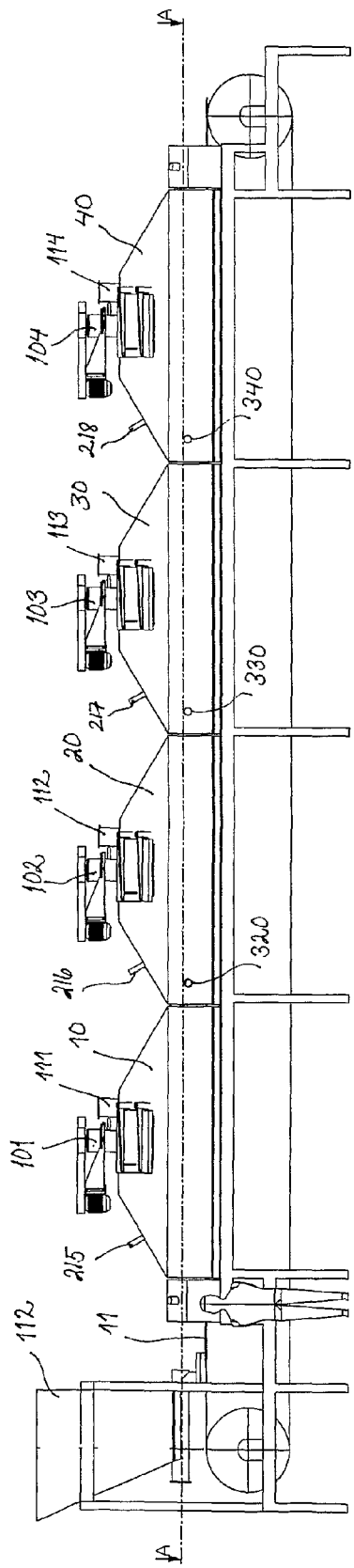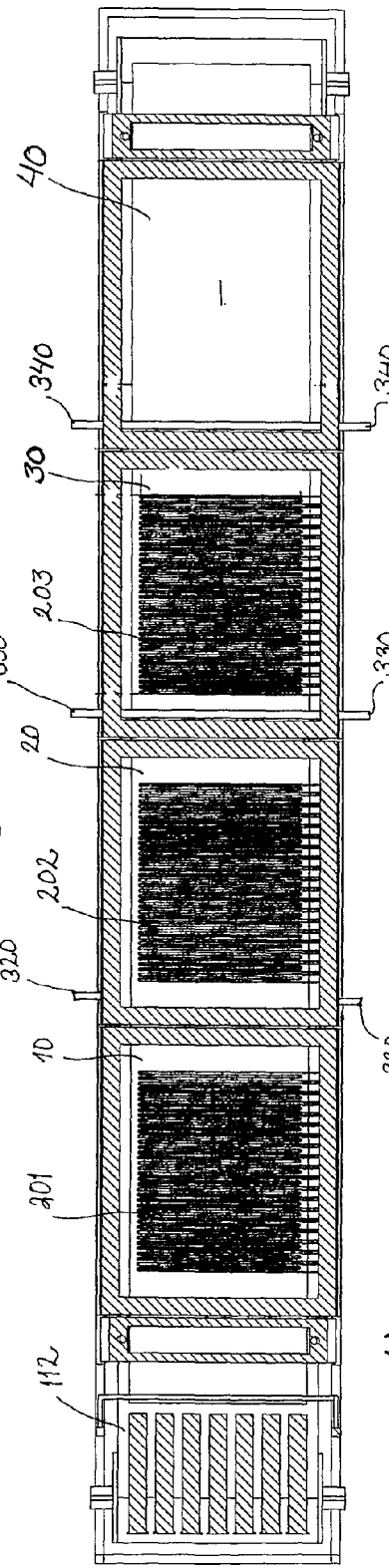

METHOD AND DEVICE FOR TREATING ANODE SLIME

This is a national stage application filed under 35 USC 371 based on International Application No. PCT/FI2005/000315 filed Jul. 5, 2005, and claims priority under 35 USC 119 of Finnish Patent Application No. 20040945 filed Jul. 7, 2004.

The invention relates to the metallurgic treatment of solid raw material containing valuable metals and selenium. More precisely, the invention relates to a method and device for treating anode slime obtained from copper electrolysis.

In copper electrolysis, the insoluble element of the anodes falls on the bottom of the electrolytic tank as anode slime, from where it is recovered when the anodes are replaced. In addition to copper and nickel, anode slime also contains metals that are more precious than copper, for example tellurium, selenium, gold, silver and platinum metals, as well as impurities such as arsenic, sulfur, antimony, bismuth and lead. Valuable metals and impurities are separated in the treatment of anode slime.

Known anode slime treatment methods are combinations of hydrometallurgic and pyrometallurgic methods. Generally anode slime contains the following ingredients: Cu, Ag, Au, Cl, Sb, Pb, Ni, Ba, Pt, Pd, As, Bi. The initial humidity of the slime is typically 10-30%.

In a known anode slime treatment process, from the slime there are first removed copper and nickel, then silver, next gold, and finally platinum metals are removed separately. Selenium is generally separated by roasting after removing copper and nickel. The separation of copper and nickel is carried out by leaching at a high pressure and temperature in the presence of sulfuric acid and oxygen, so that copper, nickel and part of the arsenic and tellurium are dissolved. After copper removal, selenium is removed by roasting. The currently used roasting process is a batch process, where slime is roasted at the temperature of about 450-600° C. In that case selenium is removed as $SeO_2$ gas.

The drawback with known roasting processes and furnaces is the limited material transfer into and from the slime. Owing to their thickness, slime layers formed on top of the trays of furnaces operated according to the batch principle restrict the degree of usage of the roasting gases. The proceeding of the roasting gases through the thick layer is slow, and respectively the exhaustion of selenium dioxide from the slime cake takes place slowly and restricts the speed of the process. Heat transfer problems are also connected to the prior art. It is difficult to control the temperature in the various steps of the process and in different parts of the furnace. The slime temperature easily rises too high, in which case the slime cake is sintered, and the material transfer into and from the slime is slowed down and may be even completely interrupted.

From the patent publication U.S. Pat. No. 4,228,133, there is known a continuously operated anode slime roasting furnace, where the slime is fed into a furnace comprising one reaction space, where the slurry is transferred from tray to tray on top of moving trays. Solids are driven to the bottom part of the furnace, from where they are collected by a scraper and conducted to a taphole provided at the bottom part of the furnace. In the furnace according to said publication, various different roasting steps cannot be realized in succession in continuous operation.

The object of the present invention is to eliminate drawbacks connected to the roasting of anode slime and to realize a novel method and furnace structure for treating anode slime in continuous operation. The furnace according to the invention has a high capacity, and the material treated according to the invention is suitable to be used as feed in Doré smelting.

The method and roasting furnace according to the present invention are based on continuous processing of anode slime and are particularly well suited to be combined with a process where anode slime is treated by hydrometallurgic methods after roasting.

In the method according to the invention, the slime containing valuable metals and selenium is dried, roasted, sulfatized and cooled. The treatment includes steps that are carried out in succession, in continuous operation, so that the slime is collected on the conveyor as a slime layer, which is then transported to be treated in successive drying, roasting, sulfatizing and sulfuric acid removal and cooling units.

The furnace according to the invention for continuously processing slime containing valuable metals and selenium comprises a drying block, a roasting block, a sulfatizing and sulfuric acid removal block as well as a cooling block, arranged in succession, at least one conveyor or two or several conveyors arranged in succession, which conveyors are arranged to convey the slime layer through the blocks from the beginning of the drying block to the end of the cooling block, and a slime feeder device that is arranged to feed anode slime at a suitable speed to the moving conveyor band.

The furnace according to the invention for treating anode slime enables a controlled roasting of anode slime for removing selenium, and the sulfatizing of the slime for example for sulfatizing silver in the same unit. In the arrangement according to the invention, the thickness of the anode slime layer can be maintained low, without still reducing the capacity of the device. Material transfer to the slime layer and away therefrom is made effective, because the slime layer is thin, and the temperature can be controlled, and consequently sintering that slows down material transfer can be prevented.

FIG. 1 is a side-view illustration of a continuously operated furnace according to an embodiment of the invention.

FIG. 2 shows the cross-section of the furnace illustrated in FIG. 1, viewed from the top.

Figure 3:
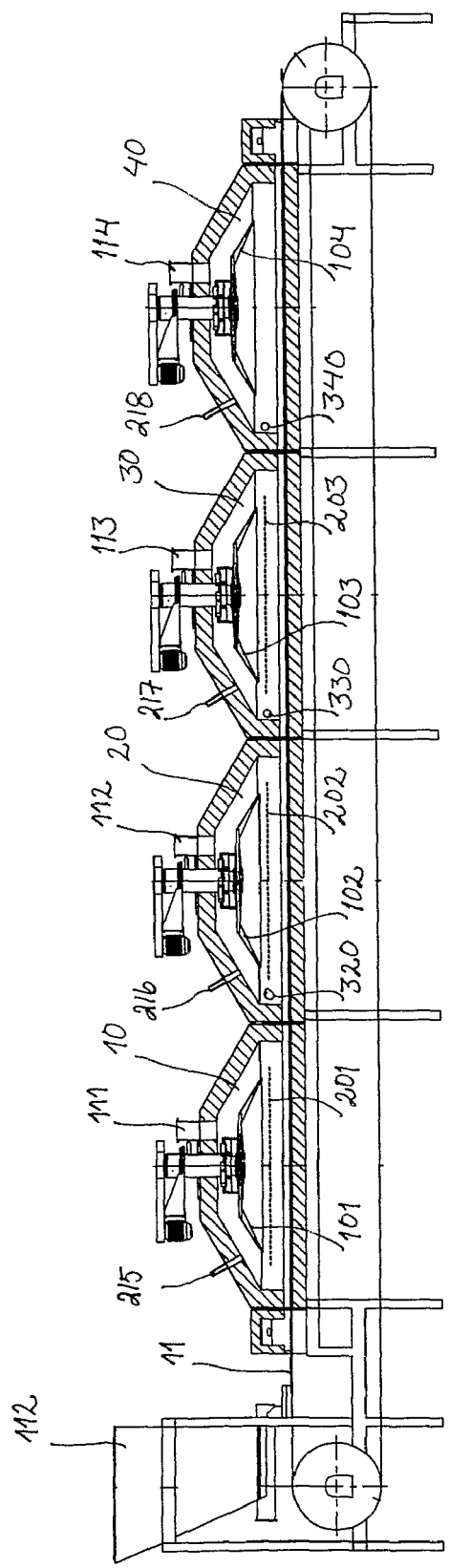
FIG. 3 shows the cross-section of the furnace illustrated in FIG. 1, viewed from the side.

The furnace comprises a band conveyor 11, onto which slime is fed from a storage silo by means of a feeder device 112 and conveyed to the first block 10 of the furnace. Onto the conveyor, there is charged a preferably uniform layer of slime with a thickness of less than 35 mm. The slime layer thickness is advantageously 10-20 mm. The speed of the conveyor 11 is selected for instance on the basis of the dimensions of the first furnace block that is the drying block 10, so that the layer reaches the desired moisture content when being discharged from the drying block. The conveyor speed is advantageously within the range 2-20 cm/min, preferably within the range 12-18 cm/min.

In the drying block 10, there is arranged a heat element 201 above the band conveyor 11 and consequently above the slime layer, through which heat element the block gases are circulated. The block 10 is provided with a fan 101 for blowing gases from the top and through the heat element towards the slime layer surface. The drying block 10 is provided with an exhaust pipe 111 for conducting the humid gas to the outlet of the block. Replacement air flows to the block 10 through air inlet pipes 215. The state of the drying block is maintained at a slight underpressure in order to prevent the gases from leaking out of the furnace. The heating power of the heat element 201 is made such that the slime layer temperature in block 10 rises up to about 100° C., where the slime is dried.

The slime layer is conveyed on the band conveyor 11 from the drying block 10 to the roasting block 20 provided with at least one gas conduit 320 for conducting the roasting gases into contact with the slime layer. Through the gas conduits 320, air or oxygen-enriched air is fed to above the slime for roasting the selenium by selenium dioxide gas. When the properties of the slime require, the roasting output can at this stage be improved by adding sulfur dioxide or sulfuric acid to the roasting gas. In the roasting block 20 the temperature of the slime layer is raised, by means of a heating element 202 arranged in the roasting block 20 up to 350-550° C. As for its mechanical structure, apart from the gas conduits, the block 20 of the roasting step may be similar to the drying block 10. The roasting block 20 is provided with a gas exhaust pipe 112, air inlet pipes 216, and a fan 102. The oxidation of selenium is an exothermic reaction and brings thermal energy to the roasting step, which means that the need for additional energy is low.

In the roasting block 20, selenium is oxidized according to the reaction formula (I) into selenium dioxide.

$$Se + O_2(g) \Rightarrow SeO_2(g) \quad (I)$$

Selenium oxide is recovered from block 20 by means of gas recovery equipment arranged in the top part of the block (not illustrated). In the recovery equipment, there is created underpressure, so that gas is collected in the recovery equipment, and in the roasting block 20 there is maintained an underpressure that prevents the gases created in the block from being emitted uncontrollably to the surroundings. From the recovery equipment, the gases are sucked into a recirculation tank by means of a solution-operated ejector. In the recirculation tank, the selenium oxide gas reacts with water resulting in selenium acid $H_2SeO_3$.

The slime is conveyed on a band conveyor 11 from the roasting block 20 to the sulfatizing block 30, where the silver contained in the slime is sulfatized. The employed sulfatizing reagent can be for example sulfuric acid in aqueous solution. The aqueous solution of sulfuric acid is sprayed on top of the slime layer through nozzles 330 arranged in the block. In this step, a possible selenium residue is removed as oxide, when the various selenides are broken owing to the effect of sulfuric acid. Also the copper possibly left in the slime is sulfatized. Likewise the possible nickel oxide of the slime is sulfatized into nickel sulfate. Also chloride, slight quantities of which are always left in the slime, is removed in this sulfatizing step.

The reactions taking place in the sulfatizing block 30 follow the reaction formulas (II)-(IV):

$$2Ag + 2H_2SO_4 \Rightarrow Ag_2SO_4 + SO_2 + 2H_2O \quad (II)$$

$$Cu + 2H_2SO_4 \Rightarrow CuSO_4 + SO_2 + 2H_2O \quad (III)$$

$$NiO + H_2SO_4 \Rightarrow NiSO_4 + H_2O \quad (IV)$$

The sulfuric acid sprayed on the slime cools the slime off. In the sulfuric acid treatment, the slime temperature is maintained, by means of a heat element 203 arranged in the block 30, at 300-410° C., preferably at 350° C., in which temperature excessive sulfuric acid is removed, and the sulfatizing of silver is carried out most completely. In the sulfatizing step, some oxygen bearing gas, advantageously air, is fed into the block 30, so that the sulfatizing output is ensured. According to an embodiment of the invention, the temperature in the block 30 is maintained within the range 250-300° C., which means that there is provided a sufficient underpressure for removing excessive sulfuric acid.

From the sulfatizing block 30, the slime is conveyed by the band conveyor 11 to the last block 40 of the furnace, where the excessive sulfuric acid of the slime is removed, and the slime is cooled off. The temperature of the cooling block 40 is lowered, by means of cooling elements arranged therein, or by means of through circulation of cooling air, down to below 300° C. The sulfatizing block 30 is provided with a gas exhaust pipe 113, air inlet pipes 217 and a fan 103. Respectively, the cooling block 40 is provided with a gas exhaust pipe 114, air inlet pipes 218 and a fan 104. The slime is conveyed out of the furnace and conducted to a silo for intermediate storage.

In a furnace according to the invention, the band conveyors are advantageously made of steel. There can be only one band conveyor, or else several band conveyors in succession, arranged so that the slime layer is transferred from one band to another without delay. The speeds of the band conveyors can be separately adjusted, in which case the delay time of the slime layer and the layer thicknesses in different blocks can be adjusted block by block, to be best suitable in each sub-process. Also the lengths of the various blocks in the proceeding direction of the conveyor can be different, in which case the processing time in each block can be arranged to better fulfill the demands.

According to an embodiment of the invention, it is not necessary to carry out the sulfatizing step. In that case the furnace can be built shorter, and the sulfatizing block can be left out.

According to another embodiment of the invention, the sulfatizing step is realized in a kiln furnace arranged in connection with the blocks, so that the material transfer between the solids and the gases becomes more effective. The slime layer is fed from the roasting block to the sulfatizing kiln furnace by the conveyor band, and the sulfatized slime layer is transferred to another conveyor that conveys the sulfatized solids to sulfuric acid removal and further to the cooling block.

EXAMPLE

Anode slime, with a humidity of 25%, was treated in a continuously operated roasting furnace according to the invention. The total length of the furnace was 16 meters. The width of the steel conveyor band was 2 meters. The furnace capacity was about 225 kg/h dry slime. The length of each of the four blocks was about 3 meters. The layer of anode slime fed onto the steel band conveyor was 10-20 mm thick.

In the drying step, there were used heat elements with a power of 80 kW, so that the rate of evaporated water was about 75 kg per hour. In the roasting step, the slime temperature was raised up to 450° C. at a heating power of 80 kW. In the third step the slime was cooled down to and maintained at 350° C., in which case the power demand was about 50 kW. In the last step, the slime was cooled down to 300° C., and the required power was about 50 kW. The power of the four furnace fans was 2 kW each.

The required quantities of chemicals per one kilo of dry slime were: 0.75 kilo sulfuric acid and 45 grams oxygen.

For a man skilled in the art, it is obvious that the various embodiments of the invention are not restricted to the appended examples and drawings only, but may vary within the scope of the appended claims.

The invention claimed is:

1. A method for treating slime containing valuable metals and selenium, in which method the slime is dried, roasted, sulfatized and cooled, wherein the method includes steps to be carried out in succession and in continuous operation, so that the slime is formed as a slime layer on the conveyor and is conveyed to be treated in succession to successive drying, roasting, sulfatizing and sulfuric acid removal and cooling units.

2. A method according to claim 1, wherein the thickness of the slime layer is under 35 mm.

3. A method according to claim 2, wherein the thickness of the slime layer is 10-20 mm.

4. A method according to claim 1, wherein in the drying unit, the slime layer is heated up to 100° C., and the removal of moisture from the slime layer is boosted by a fan.

5. A method according to claim 1, wherein in the roasting unit, the temperature of the slime layer is raised up to the range 350-550° C., and that the material transfer in the slime layer is boosted by a fan.

6. A method according to claim 1, wherein in the sulfatizing and sulfuric acid removal unit, the temperature of the slime layer is set within the range 250-350° C., and the employed sulfatizing reagent is sulfuric acid.

7. A furnace for treating slime containing valuable metals and selenium in continuous operation, in which furnace the slime is roasted for removing the selenium and for sulfatizing the metals, wherein the furnace comprises a drying block, a roasting block, a sulfatizing and sulfuric acid removal block and a cooling block, arranged in succession, at least one conveyor that is arranged to convey the slime layer through the blocks from the beginning of the drying block to the end of the cooling block, and a slime feeder device, that is arranged to feed anode slime at a suitable speed to the moving conveyor band.

8. A furnace according to claim 7, wherein there are two or more conveyors arranged in succession.

9. A furnace according to claim 7, wherein the feeder device can be arranged to form an anode slime layer with a thickness of 35 mm or thinner onto the slime conveyor.

10. A furnace according to claim 7, wherein in the drying block, in the roasting block and in the sulfatizing and sulfuric acid removal block, above the conveyor, there is in each block arranged a heater and a fan above the heater.

11. A furnace according to claim 7, wherein the cooling block is provided with at least one cooling element for cooling the slime layer.

* * * * *